United States Patent
Ishii

(10) Patent No.: US 6,752,318 B2
(45) Date of Patent: Jun. 22, 2004

(54) OPTICAL SYMBOL READING DEVICE

(75) Inventor: Kazuo Ishii, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/320,457

(22) Filed: May 27, 1999

(65) Prior Publication Data

US 2002/0043563 A1 Apr. 18, 2002

(30) Foreign Application Priority Data

May 28, 1998 (JP) ............................................. 10-147355

(51) Int. Cl.[7] ............................. G06B 3/10; G06K 7/10
(52) U.S. Cl. ................................. 235/470; 235/462.23
(58) Field of Search ............................ 235/454, 462.01, 235/462.22, 462.23, 462.31, 462.32, 470

(56) References Cited

U.S. PATENT DOCUMENTS

| | | | | |
|---|---|---|---|---|
| 3,086,121 A | * | 4/1963 | Cockrell | 235/454 |
| 3,899,687 A | * | 8/1975 | Jones | 235/454 X |
| 4,656,343 A | * | 4/1987 | Gerritsen et al. | 235/454 |
| 4,920,255 A | * | 4/1990 | Gabeler | 235/454 |
| 5,122,644 A | * | 6/1992 | Hasegawa et al. | 235/470 |
| 5,308,960 A | * | 5/1994 | Smith et al. | 235/454 |
| 5,311,999 A | * | 5/1994 | Malow et al. | 235/470 X |
| 5,331,118 A | * | 7/1994 | Jensen | 177/25.14 |
| 5,373,363 A | * | 12/1994 | Kobayashi | 356/383 |
| 5,436,439 A | * | 7/1995 | Nishimura et al. | 235/462.14 |
| 5,448,078 A | | 9/1995 | Nakazawa | 250/559.24 |
| 5,481,096 A | * | 1/1996 | Hippenmeyer et al. | 235/454 |
| 5,525,788 A | * | 6/1996 | Bridgelall et al. | 235/470 X |
| 5,616,909 A | * | 4/1997 | Arackellian | 235/462.22 |
| 5,636,028 A | * | 6/1997 | Stringer et al. | 356/383 |
| 5,869,827 A | * | 2/1999 | Rando | 235/454 X |
| 5,912,447 A | * | 6/1999 | Bjorner et al. | 235/454 |
| 5,966,457 A | * | 10/1999 | Lemelson | 382/141 |
| 6,000,618 A | * | 12/1999 | Saporetti | 235/462.01 X |
| 6,049,406 A | * | 4/2000 | Zocca | 235/470 |
| 6,142,376 A | * | 11/2000 | Cherry et al. | 235/462.32 X |
| 6,161,759 A | * | 12/2000 | Moss et al. | 235/462.01 |
| 6,325,289 B1 | * | 12/2001 | Mazzone | 235/462.23 X |
| 6,347,740 B1 | * | 2/2002 | Bengala | 235/454 |
| 6,619,550 B1 | * | 9/2003 | Good et al. | 235/462.01 |
| 2003/0085281 A1 | * | 5/2003 | Knowles et al. | 235/454 |

FOREIGN PATENT DOCUMENTS

| | | | |
|---|---|---|---|
| EP | 0 647 479 A2 | | 4/1995 |
| JP | 62-237586 | | 10/1987 |
| JP | 3-1285 | * | 1/1991 |
| JP | 5-67227 | | 3/1993 |
| JP | 7-319989 | * | 12/1995 |
| JP | 7334606 | | 12/1995 |

OTHER PUBLICATIONS

European Search Report dated Feb. 9, 2001.

* cited by examiner

Primary Examiner—Jared J. Fureman
(74) Attorney, Agent, or Firm—Foley & Lardner LLP

(57) ABSTRACT

For receiving clear image data of symbols applied to the front surface or back surface of an article that is moved by, for example, a conveyor and for which the reading distance is constantly changing, a symbol reading device is provided with an image data input focus point control section that outputs position data of the article from a front surface/back surface position detector to an image data input focus point modifier such that the focus point of a camera or waist position of a laser beam for image data input can be constantly matched to the front surface or back surface of the article.

10 Claims, 2 Drawing Sheets

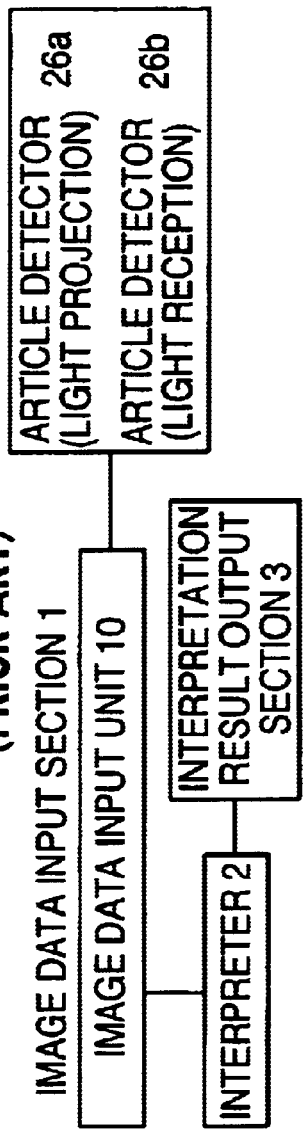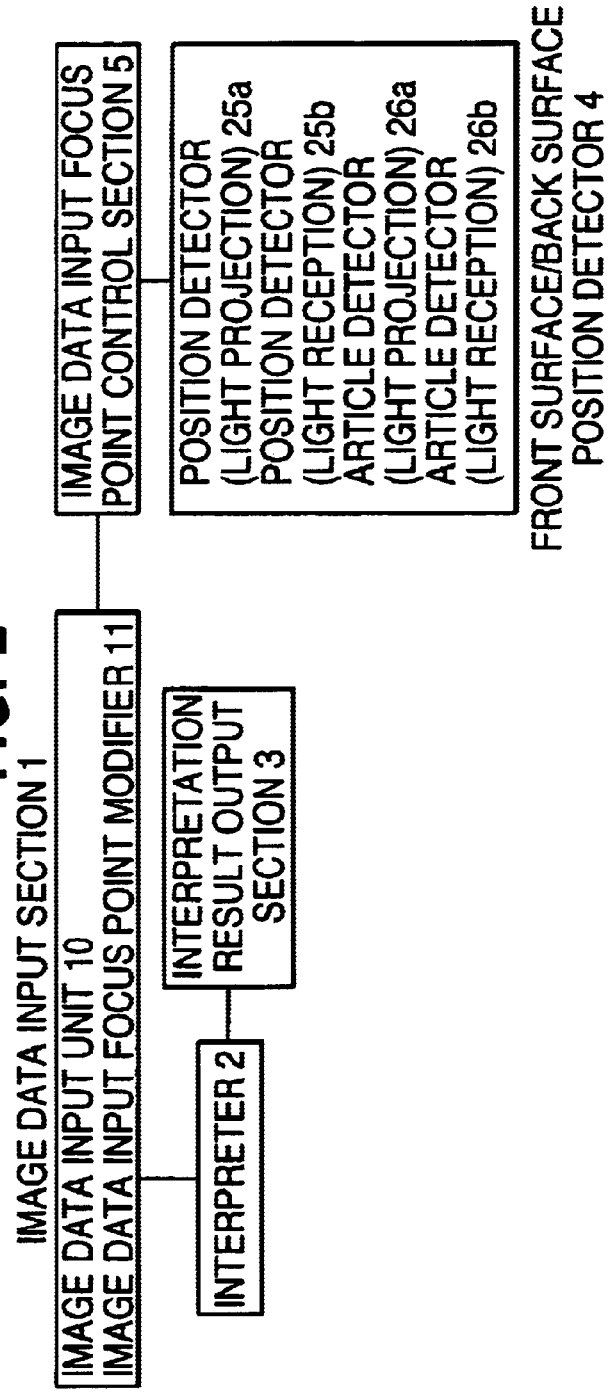

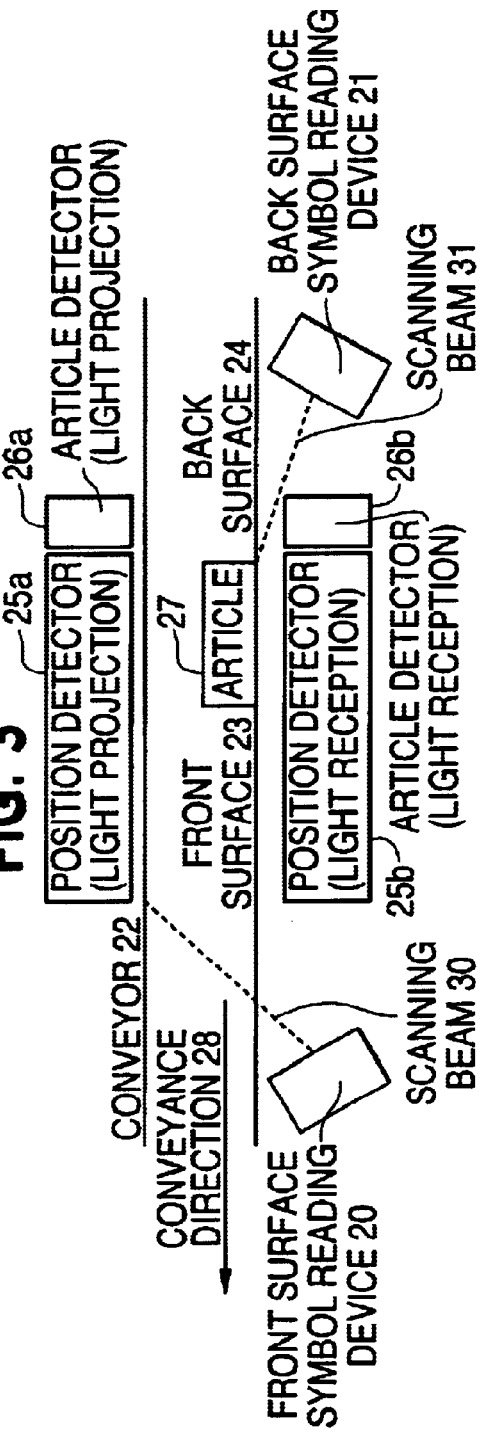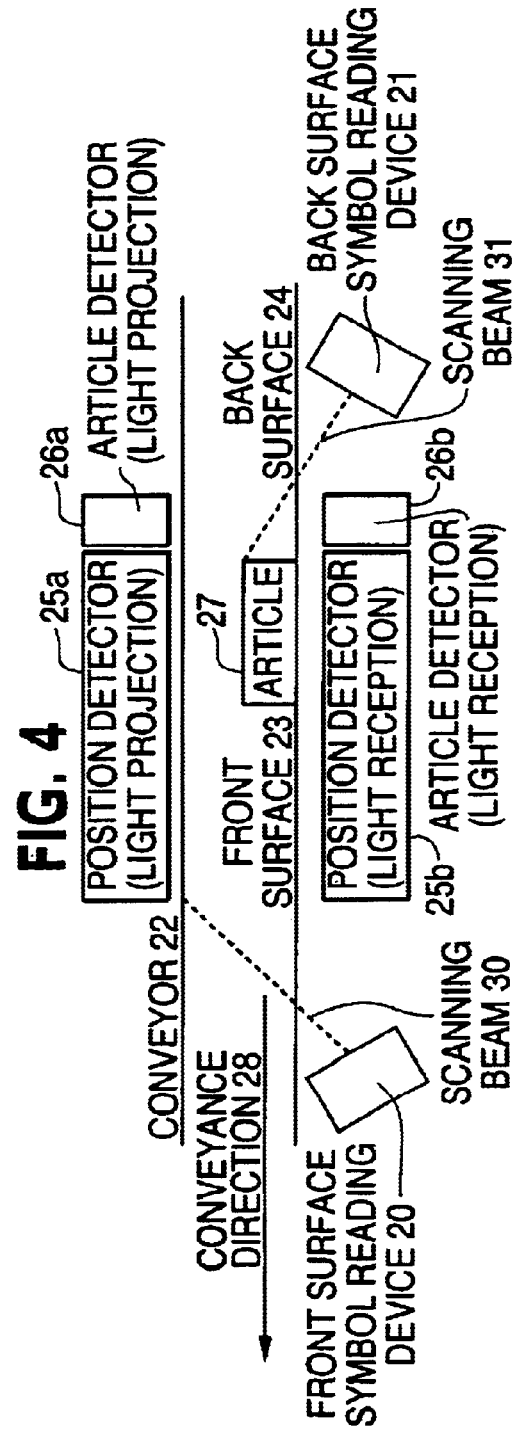

OPTICAL SYMBOL READING DEVICE

BACKGROUND OF THE INVENTION

1. Field of the Invention

The present invention relates to a symbol reading device, and particularly to an optical symbol reading device for reading symbols on the front and back surfaces of an article moved by, for example, a conveyor.

2. Description of the Related Art

An article that is moved by, for example, a conveyor and that bears symbols to be read, movement caused by the conveyor brings the front surface of the article toward the symbol reading device and then moves the back surface away from the symbol reading device. In other words, when reading symbols on the front or back surface of an article, the input of the image data of the symbols must be carried out while the reading distance, which is the distance between the reading device and the symbols, is in a constantly changing state.

Typical methods of receiving optical image data include the use of a camera such as an image pickup tube or CCD, or directing a laser beam scan light onto the surface to which symbols are applied and detecting the reflected light.

FIG. 1 shows a symbol reading device of the prior art that reads bar code labels by scanning by a laser beam.

In the prior-art symbol reading device of FIG. 1, article detector (light projection) 26a and article detector (light reception) 26b first detect that an article bearing a bar code to be read has entered the read zone, following which image data input unit 10, which constitutes image data input section 1, directs a laser beam scanning light upon the surface of the bar code label, a photo-sensor detects the light of the laser beam scanning light that is reflected from the surface of the bar code label, an electric signal converter converts the detection lights to electric signals and these are interpreted by interpreter 2, and the interpretation results are then outputted by way of interpretation result output section 3 to an external device. Image data input section 1 that uses a camera is made up by a camera that uses an image pickup tube or CCD.

As can be understood from focusing a camera, a clear image free of blurring can be obtained in image data input by camera of the prior art by focusing such that the reading distance, which is the distance between the camera and the symbol, i.e., the article to be read, is equal to the focal length of the camera lens.

In other words, clear images that are free from blurring cannot be obtained when reading symbols on the front and back surfaces because the above-described reading distance is constantly changing as described above.

Similarly, regarding the method of the prior art in which a laser beam scan light is irradiated, it is common knowledge that the beam diameter of the laser beam scanning light such as outputted from the image data input unit is not uniform but rather, first converges with increasing distance from the image data input unit and then diverges. At the waist position at which the laser beam converges to its narrowest diameter, i.e., at the focus point, resolution is high and a clear image free of blurring can be obtained, but at positions other than the focus point, the laser beam broadens, resolution falls, and as with the above-described camera, blurring occurs and a clear image cannot be obtained.

In other words, when input of image data is carried out at points other than the focus point in a symbol reading device in which reading is realized by irradiating a laser beam upon a bar code label and then reading the reflected light, the laser beam diameter is broad and resolution is low. As a result, the bar widths that make up a bar code cannot be accurately detected and the reading performance of the symbol reading device suffers. In image data input by means of a camera as well, the image goes out of focus, clear image data cannot be obtained, and reading performance drops.

For these reasons, large symbols have been used with symbol reading devices of the prior art that read symbols on front and back surfaces, thereby reducing the effect of the above-described blurring.

With large symbols, symbol data are not lost despite blurring. Larger symbols, however, require larger labels or paper for printing, and therefore entail the disadvantage of increased operation costs.

A further disadvantage is that larger labels cannot be applied to small articles.

SUMMARY OF THE INVENTION

It is an object of the present invention to provide a high-performance optical symbol reading device that is capable of always matching the focus point to the front or back surface of an article when reading the front surface or back surface of an article for which the reading distance is in constant change.

The optical symbol reading device of this invention is made up of: an image data input section that is provided with an image data input unit for receiving a bar code label, characters, symbols, or image data on an article that is moved by a conveyor; an article detector for detecting that an article has entered the read zone; an interpreter for converting electric signals from the image data input section to numbers or characters; and an interpretation result output section for outputting the interpretation results of the interpreter to an external device;

wherein the image data input section is provided with:
an image data input focus point modifier;
and the optical symbol reading device further comprises:
a front surface/back surface position detector for detecting the position on the conveyor of the front surface or back surface of an article that is moved by the conveyor, and an image data input focus point control section that outputs information from the front surface/back surface position detector to the image data input focus point modifier.

In addition, the front surface/back surface position detector is provided with means that is provided with a light projection position detector and a light reception position detector made up of a plurality of transmissive multiple optical axis sensors, for finding the position of the front surface or back surface of an article by detecting which transmissive multiple optical axis sensors of the plurality of transmissive multiple optical axis sensors of the light projection position detector are being shielded by the article.

In addition, the front surface/back surface position detector is provided with means that includes a rotary encoder that is attached to the conveyor, for finding the position of the front surface or back surface of the article by counting pulses from the rotary encoder and measuring the distance of movement of the conveyor.

In addition, the image data input focus point control section may also include means for converting the front surface/back surface position data of the article that are received from the front surface/back surface position detector to a reading distance, which is the distance between the image data input unit and the front surface or back surface of the article, and outputting the reading distance as focus point data to the image data input focus point modifier.

In addition, the image data input focus point modifier may include means for matching the focus point to the front surface or back surface of an article that is constantly moving over time by setting the focus point to a position designated by focus point data that are received from the image data input focus point control section.

Further, means may be included for reading two surfaces, i.e., the side surface/back surface or side surface/front surface of an article that is moved by a conveyor, by fixing the focus on the position of the side surface and reading the side surface when receiving a bar code label, characters, symbols, or image data on a side surface of the article from the image data input unit.

In other words, this invention provides an image data input focus point control section that outputs position data of an article that are received from the front surface/back surface position detector to an image data input focus point modifier for the purpose of obtaining clear image data of, for example, symbols applied to the front or back surface of an article that is being moved by, for example, a conveyor and for which the reading distance is constantly changing, thereby enabling matching of the focus point of a camera or waist point of a laser beam for image data input to the front or back surface of the article and realizing the input of clear image data.

The above and other objects, features, and advantages of the present invention will become apparent from the following description based on the accompanying drawings which illustrate an example of a preferred embodiment of the present invention.

BRIEF DESCRIPTION OF THE DRAWINGS

FIG. 1 is a block diagram showing reading of symbols on a front surface/back surface by a symbol reading device of the prior art which reads a bar code label by scanning a laser beam according to techniques of the prior art;

FIG. 2 is a block diagram showing an optical symbol reading device according to an embodiment of the present invention;

FIG. 3 shows the arrangement of the optical symbol reading device of the embodiment of the invention and the position of the conveyed article; and FIG. 4 again shows the arrangement of the optical symbol reading device of the embodiment of the invention and the position of the conveyed article.

DETAILED DESCRIPTION OF THE PREFERRED EMBODIMENTS

An embodiment of the invention is next described with reference to the accompanying figures. FIG. 2 is a block diagram showing the optical symbol reading device according to the embodiment of the invention.

The symbol reading device according to the invention shown in FIG. 2 is made up of: image data input section 1 which is composed of image data input unit 10 and image data input focus point modifier 11; interpreter 2, interpretation result output section 3, front surface/back surface position detector 4, and image data input focus point control section 5.

Operation of the symbol reading device according to the invention is next explained using FIG. 2, FIG. 3, and FIG. 4. FIGS. 3 and 4 show views taken from directly above the conveyor of article 27 being conveyed by conveyor 22 toward the left in FIG. 3 and FIG. 4 as shown by conveyance direction 28. Front surface symbol reading device 20 reads symbols by scanning front surface 23 of article 27 in an up-down direction by means of scanning beam 30 composed of a laser beam and receiving the light reflected from the symbols, such as a bar code label, present on front surface 23. In the same way as front surface symbol reading device 20, back surface symbol reading device 21 reads symbols by scanning back surface 24 in an up-down direction by means of scanning beam 31 composed of a laser beam and receiving the light reflected from the symbols, such as a bar code label, present on back surface 24.

Article 27 is first conveyed by conveyor 22 in the direction of conveyance direction 28, and the back end of conveyed article 27 is detected by article detectors 26a and 26b when the article reaches the position shown in FIG. 3. Article detectors 26a and 26b typically employ a transmissive sensor or a reflective sensor.

Here, the back end of conveyed article 27 is the back surface of conveyed article 27. Scanning beam 31 must be directed onto back surface 24 in order to read symbols present on the back surface of article 27, and the position of article 27 shown in FIG. 3 is the starting point of this irradiation. The position of article 27 shown in FIG. 4 is the ending point of this irradiation. This ending point is related to the width of article 27, and a particular set value is therefore established and scanning ends when the back end of article 27 exceeds this set value.

Back surface symbol reading device 21 begins reading the symbols on back surface 24 of article 27 from the position of article 27 shown in FIG. 3 and completes the scanning of back surface 24 at the position shown in FIG. 4.

Here, article 27 is moved by conveyor 22, and the movement of back surface 24 away from back surface symbol reading device 21 causes a change in the distance between back surface symbol reading device 21 and back surface 24, i.e., the reading distance, and this change can be seen in the change of the length of scanning beam 31 in FIG. 3 and FIG. 4. Similarly, it can be seen from FIG. 3 and FIG. 4 that the approach of front surface 23 to front surface symbol reading device 20 brings about change in the distance between front surface symbol reading device 20 and front surface 23, i.e., the reading distance.

To obtain clear image data of symbols such as bar code present on back surface 24, the focus point of the symbol reading device must be constantly matched to the reading distance, which changes constantly with the movement of article 27 as described hereinabove.

The above-described focus point is the focus point of the scanning beam realized by a laser beam outputted by image data input unit 10 or the camera incorporated in image data input unit 10.

To realize this matching, front surface/back position detector 4 of article 27 first detects the back end of article 27 by means of article detectors 26a and 26b and then outputs this detection as a back end detection signal to image data input focus point control section 5.

Image data input focus point modifier 11 receives the focus point data from image data input focus point control section 5 and has the function of setting to any distance the focus point of a camera or of a scanning beam realized by a laser beam outputted by image data input unit 10.

Accordingly, upon receiving the back end detection signal, image data input focus point control section 5 outputs the focus point information, which corresponds to the length of the broken line of scanning beam 31, to image data input focus point modifier 11, which is to set the focus point at this time point to the length of the broken line of scanning beam 31 as shown in FIG. 3. This operation enables matching of the focus point to back surface 24 of article 27 shown in FIG. 3.

Article 27 then moves in the direction of conveyance direction 28 and the reading distance accordingly changes. It can here be seen from FIG. 3 that this reading distance is determined by the position of article 27 on conveyor 22. FIGS. 3 and 4 show a method in which the detection of the position of article 27 on conveyor 22 is realized by position detector (light projection) 25a and position detector (light reception) 25b made up of a plurality of transmissive multiple optical axis sensors. This is a method by which the back end of article 27 is directly found depending on where the plurality of sensors of position detector (light projection) 25a are shielded by article 27. Front surface/back surface position detector 4 then outputs the back end position data of article 27 outputted from position detector (light reception) 25b to image data input focus point control section 5.

Image data input focus point control section 5 next converts the back end position data to the reading distance and outputs the result as focus point data to image data input focus point modifier 11. Image data input focus point modifier 11 can then match the focus point to back surface 24 of constantly moving article 27 by setting the focus point to the position set by the focus point data. Clear image data input can therefore be obtained and a high-performance symbol reading device can be realized.

Reading of front surface 23 is equivalent to that for back surface 24 and explanation is therefore here omitted.

Although transmissive multiple optical axis sensors were employed for position detectors 25a and 25b in FIGS. 3 and 4, a method may also be used by which the position of an article is detected by attaching a rotary encoder to the conveyor and then measuring the distance of movement of the conveyor by counting pulses from the rotary encoder. Alternatively, if the conveyance speed of the conveyor is known, the position of the back end of an article can also be obtained by calculating the elapsed time following detection of the back end of the article by article detectors 26a and 26b.

During the time interval from detection of front surface 23 of article 27 by article detectors 26a and 26b to detection of back surface 24, scanning beam 31 scans side surface 25, and since the reading distance is fixed at this stage, reading of side surface 25 can be realized with the focus fixed to the position of side surface 25. In this way, reading of two sides, i.e., the side surface/back surface or the front/side surface, can be realized by a single symbol reading device.

In addition, this invention is effective not only in a linear CCD or line scanning laser scan-type symbol reading device in which the track of the scanning beam is a straight line, but in a symbol reading device that takes in and reads a two-dimensional image.

The invention as described hereinabove enables matching of the focus point to the front surface/back surface of an article even in the case of reading the front surface/back surface of an article for which reading distance is changing over time, thereby enabling clear image data to be obtained and providing a high-performance symbol reading device for symbols present on the front surface/back surface of an article.

While a preferred embodiment of the present invention has been described using specific terms, such description is for illustrative purposes only, and it is to be understood that changes and variations may be made without departing from the spirit or scope of the following claims.

What is claimed is:

1. An optical symbol reading device comprising:
   a) an image data input section including:
      1) a front surface symbol reading device and back surface symbol reading device,
      2) an image data input unit for receiving a bar code label, characters, symbols, or image data on an article that is moved by a conveyor, and
      3) an image data input focus point modifier;
   b) an article detector for detecting that said article has entered a read zone;
   c) an interpreter for converting electric signals from said image data input section to electronic signals representative of at least one of numbers and characters as interpretation results;
   d) an interpretation result output section for outputting the interpretation results of said interpreter to an external device;
   e) a front surface/back surface position detector for continuously detecting a position on said conveyor of both a front surface and a back surface of an article as said article is moved by said conveyor to provide data indicative of continuously changing positions of said article; and
   f) an image data input focus point control section for outputting data from said front surface/back surface position detector to said image data input focus point modifier, said image data input focus point modifier continuously adjusting the focus point of said front surface reading device and said back surface reading device based on said data from said front surface/back surface position detector, said continuous adjusting being made without time delay based on conveyor speed.

2. An optical symbol reading device according to claim 1 wherein said front surface/back surface position detector comprises:
   means that is provided with a light projection position detector and a light reception position detector made up of a plurality of transmissive multiple optical axis sensors, for finding the position of the front surface or back surface of said article by detecting which transmissive multiple optical axis sensors of the plurality of transmissive multiple optical axis sensors of said light projection position detector are being shielded by said article.

3. An optical symbol reading device according to claim 1 wherein said image data input focus point control section comprises:
   means for converting front surface/back surface position data of said article that are received from said front surface/back surface position detector to a reading distance, which is the distance between said image data input unit and the front surface or back surface of said article, and outputting said reading distance as focus point data to said image data input focus point modifier.

4. An optical symbol reading device according to claim 1 wherein said image data input focus point modifier comprises:
   means for matching the focus point to the front surface or back surface of said article that moves constantly over time by setting the focus point to a position designated by said focus point data that are received from said image data input focus point control section.

5. An optical symbol reading device according to claim 1 further comprising:

means for reading two surfaces, a side surface/back surface or a side surface/front surface, of an article moved by a conveyor by fixing a focus on a position of said side surface and reading said side surface when receiving a bar code label, characters, symbols, or image data on the side surface of said article from said image data input unit.

6. A method of reading an optical symbol, comprising the steps of:

a) conveying an article on a conveyor, said article including a first optical symbol on a front surface and a second optical symbol on a back surface;

b) reading said first optical symbol while conveying said article; and c) reading said second optical symbol while conveying said article, d) wherein the step of reading said first optical symbol comprises the steps of:
1) detecting said front surface of said article;
2) calculating a distance from an optical symbol reader to said front surface;
3) continuously adjusting a focus of said optical symbol reader based on said calculated distance to said front surface without time delay based on conveyor speed; and
4) sensing said first optical symbol with said optical symbol reader, and e) wherein the step of reading said second optical symbol comprises the steps of:
1) detecting said back surface of said article;
2) calculating a distance from said optical symbol reader to said back surface;
3) continuously adjusting the focus of said optical symbol reader based on said calculated distance to said back surface without time delay based on conveyor speed; and
4) sensing said second optical symbol with said optical symbol reader.

7. The method of claim 6, wherein the steps of detecting said front and back surfaces comprises the steps of:

sensing a plurality of optical axis, each of said optical axis corresponding to a different position along a conveyor; and determining which of said plurality of optical axis are shielded by said article.

8. The method of claim 6, wherein the step of detecting said front surface detects the leading edge of said surface.

9. The method of claim 6, wherein the step of detecting said back surface detects the trailing edge of said surface.

10. A method of reading a symbol, comprising the steps of:

a) conveying an article on a conveyor, said article including at least one optical symbol which is positioned on at least one of a front surface and a back surface of said article;

b) reading said at least one optical symbol by:
1) detecting at least one of said front surface and said back surface of said article;
2) calculating a distance from an optical symbol reader to said at least one of said front surface and said back surface of said article;
3) continuously adjusting a focus of said optical symbol reader based on said calculated distance to said at least one of said front surface and back surface without time delay based on conveyor speed; and
4) sensing said at least one optical symbol with said optical symbol reader.

* * * * *